US008123389B2

(12) United States Patent
Hitchcock et al.

(10) Patent No.: US 8,123,389 B2

(45) Date of Patent: Feb. 28, 2012

(54) LED LAMP ASSEMBLY WITH THERMAL MANAGEMENT SYSTEM

(75) Inventors: Robert Hitchcock, Scotts Valley, CA (US); James Kingman, Woodside, CA (US); Matthew Weaver, Scotts Valley, CA (US); Dustin Cochran, Scotts Valley, CA (US); Sanjoy Ghose, Scotts Valley, CA (US)

(73) Assignee: Lumenetix, Inc., Scotts Valley, CA (US)

( * ) Notice: Subject to any disclaimer, the term of this patent is extended or adjusted under 35 U.S.C. 154(b) by 11 days.

(21) Appl. No.: 12/757,793

(22) Filed: Apr. 9, 2010

(65) Prior Publication Data

US 2011/0134645 A1 Jun. 9, 2011

Related U.S. Application Data

(60) Provisional application No. 61/304,359, filed on Feb. 12, 2010.

(51) Int. Cl.
*F21V 5/00* (2006.01)
*F21V 29/00* (2006.01)
*G02B 21/26* (2006.01)

(52) U.S. Cl. ........ 362/580; 362/547; 362/218; 362/264; 362/294; 362/345; 362/373

(58) Field of Classification Search .................. 362/580, 362/547, 218, 264, 294, 345, 373
See application file for complete search history.

(56) References Cited

U.S. PATENT DOCUMENTS 3,316,497 A 4/1967 Brooks
3,390,341 A 6/1968 Kline
3,654,563 A 4/1972 Hesler et al.
4,237,023 A 12/1980 Johnson
4,504,402 A 3/1985 Chen et al.
4,581,285 A 4/1986 Mahefkey, Jr.
4,749,951 A 6/1988 Tanaka
5,315,154 A 5/1994 Elwell
(Continued)

FOREIGN PATENT DOCUMENTS

EP 0612105 A1 8/1994
(Continued)

OTHER PUBLICATIONS

International Search Report PCT/US2009/069290 dated Jul. 14, 2010, pp. 1-3.

(Continued)

*Primary Examiner* — William Carter

(74) *Attorney, Agent, or Firm* — Perkins Coie LLP

(57) ABSTRACT

A lighting system is described. The lighting system includes a lamp and a first container including a first phase change material thermally connected to the lamp. Heat generated by the lamp during operation is conducted to the first phase change material. The system also includes a second container including a second phase change material thermally connected to the lamp. Heat generated by the lamp during operation is also conducted to the second phase change material, and the second phase change material has a transition point temperature lower than the transition point temperature of the first phase change material of the first container to account for a temperature drop between the second container and the first container. The lighting system also includes a temperature sensor for reducing lamp power if the lamp becomes too hot, and a mounting bracket which may also conduct heat away from the lamp.

18 Claims, 13 Drawing Sheets

U.S. PATENT DOCUMENTS

| | | | |
|---|---|---|---|
| 5,722,482 A | 3/1998 | Buckley | |
| 6,452,217 B1 | 9/2002 | Wojnarowski et al. | |
| 6,482,332 B1 | 11/2002 | Malach | |
| 7,252,140 B2 | 8/2007 | Glezer et al. | |
| 7,279,970 B2 | 10/2007 | Yokoyama et al. | |
| 7,345,320 B2 | 3/2008 | Dahm | |
| 7,575,354 B2 | 8/2009 | Woodward | |
| 7,810,965 B2 | 10/2010 | Weaver | |
| 7,989,839 B2 | 8/2011 | Dahm | |
| 8,047,690 B2 | 11/2011 | Weaver | |
| 2002/0033247 A1 | 3/2002 | Neuschutz et al. | |
| 2002/0147242 A1 | 10/2002 | Salyer et al. | |
| 2004/0057234 A1 | 3/2004 | Mohacsi | |
| 2004/0113044 A1 | 6/2004 | Ishiguchi | |
| 2004/0159422 A1 | 8/2004 | Zuo et al. | |
| 2005/0158687 A1 | 7/2005 | Dahm | |
| 2005/0196720 A1* | 9/2005 | Ostler et al. | 433/29 |
| 2005/0231983 A1 | 10/2005 | Dahm | |
| 2005/0276053 A1 | 12/2005 | Nortrup et al. | |
| 2006/0044059 A1 | 3/2006 | Yokoyama et al. | |
| 2006/0044804 A1* | 3/2006 | Ono et al. | 362/294 |
| 2006/0086096 A1 | 4/2006 | Ghoshal | |
| 2006/0151146 A1 | 7/2006 | Chou et al. | |
| 2007/0114010 A1 | 5/2007 | Upadhya et al. | |
| 2007/0125522 A1 | 6/2007 | Stefanoski | |
| 2007/0230183 A1 | 10/2007 | Shuy | |
| 2007/0268694 A1 | 11/2007 | Bailey et al. | |
| 2007/0279921 A1 | 12/2007 | Alexander et al. | |
| 2008/0094841 A1 | 4/2008 | Dahm | |
| 2008/0094850 A1 | 4/2008 | Woodward | |
| 2008/0285271 A1 | 11/2008 | Roberge et al. | |
| 2009/0021944 A1 | 1/2009 | Lee et al. | |
| 2009/0219726 A1 | 9/2009 | Weaver et al. | |
| 2009/0273921 A1 | 11/2009 | Chiang | |
| 2010/0295468 A1* | 11/2010 | Pedersen et al. | 362/218 |
| 2011/0084608 A1* | 4/2011 | Lin et al. | 362/545 |

FOREIGN PATENT DOCUMENTS

| | | | |
|---|---|---|---|
| EP | 1717632 | A1 | 11/2006 |
| JP | 2002057262 | | 2/2002 |
| JP | 2004319658 | | 11/2004 |
| JP | 2007080463 | | 3/2007 |
| KR | 102005004708 | A | 5/2005 |
| KR | 1020080070001-1 | A | 7/2008 |
| KR | 20100017600 | A | 2/2010 |
| WO | WO-02086795 | A1 | 10/2002 |
| WO | WO-2009001254 | A2 | 12/2008 |
| WO | WO-200910987 | A1 | 1/2009 |

OTHER PUBLICATIONS

Written Opinion PCT/US2009/069290 dated Jul. 14, 2010, pp. 1-3.

Co-pending U.S. Appl. No. 12/892,696, filed Sep. 28, 2010.

Non-Final Office Action Mailed Oct. 28, 2010 in Co-pending U.S. Appl. No. 12/368,936, filed Feb. 10, 2009.

Notice of Allowance Mailed Sep. 1, 2010 in Co-pending U.S. Appl. No. 12/370,521, filed Feb. 12, 2009.

Co-pending U.S. Appl. No. 12/370,521, filed Feb. 12, 2009.

Co-pending U.S. Appl. No. 12/237,313, filed Sep. 24, 2008.

Co-pending U.S. Appl. No. 12/368,936, filed Feb. 10, 2009.

International Search Report PCT/US2009/001253 dated May 27, 2009 pp. 1-3.

Written Opinion PCT/US2009/001253 dated May 27, 2009 pp. 1-3.

International Search Report PCT/US2009/001293 dated Oct, 9, 2009 pp. 1-4.

Written Opinion PCT/US2009/001293 dated Oct. 9, 2009 pp. 1-7.

Non-Final Office Action Mailed Jul. 12, 2010 in Co-pending U.S. Appl. No. 12/370,521, filed Feb. 12, 2009.

Behr, A.T. et al., "Nonlinearities of Capacitors Realized by MOSFET Gates", Proceedings of the International Symposium on Circuits and Systems, San Diego, May 10-13, 1992 [Proceedings of the International Symposium on Circuits and Systems, (ISCAS)], New York, IEEE, US, vol. 3, May 3, 1992, pp. 1284-1287, XP010061392 ISBN: 978-0-7803-0593-9.

Berkhout, M., "An Integrated 200-W Class-D Audio Amplifier", IEEE Journal of Solid-State Circuits, IEEE Service Center, Piscataway, NJ, US, vol. 38, No. 7, Jul. 1, 2003, pp. 1198-1206, XP001169604.

Co-pending U.S. Appl. No. 13/284,773 filed Oct. 28, 2011.

Co-pending U.S. Appl. No. 61/032,988 filed Mar. 2, 2008.

Co-pending U.S. Appl. No. 61/032,989 filed Oct. 28, 2011.

Co-pending U.S. Appl. No. 61/304,359 filed Feb. 12, 2010.

Final Office Action Mailed Jan. 25, 2011 in Co-pending U.S. Appl. No. 12/358,936 filed Feb. 10, 2009.

Gaalaas, E. et al., "Integrated Stereo Delta Sigma Class D Amplifier", IEEE Journal of Solid-State Circuits , IEEE Service Center, Piscataway, NJ, US [online] vol. 40, No. 12, Dec. 1, 2005, pp. 2388-2397, XP002504060, issn: 0018-9200, Retrieved from the Internet: URL:http://ieeexplore.ieee.org.[retrieved on Nov. 14, 2008, pp. 2388-2392].

Non-Final Office Action Mailed Mar. 16, 2011 in Co-pending U.S. Appl. No. 12/892,696 filed Sep. 28, 2010.

Notice of Allowance Mailed Jul. 29, 2011 in Co-pending U.S. Appl. No. 12/892,696 filed Sep. 28, 2010.

Notice of Allowance Mailed Mar. 2, 2011 in Co-pending U.S. Appl. No. 12/358,936 filed Feb. 10, 2009.

Restriction Requirement Mailed Mar. 1, 2011 in Co-pending U.S. Appl. No. 12/237,313 filed Sep. 24, 2008.

Wang et al., "A Nonlinear Capacitance Cancellation Technique and and its Application to a CMOS Class AB Power Amplifier", 2001 IEEE Radio Frequency Integrated Circuits (RFIC) Symposium, Digest of Papers, Phoenix, AZ, May 20-22, 2001; [IEEE Radio Frequency Integrated Circuits Symposium], New York, NY, IEEE, US, May 20, 2001, pp. 39-42, XP010551317, ISBN: 978-0/7803-6601-5, pp. 40.

* cited by examiner

LED LAMP ASSEMBLY WITH THERMAL MANAGEMENT SYSTEM

CLAIM OF PRIORITY

This application claims priority to U.S. Provisional Patent Application No. 61/304,359 entitled "LED LAMP ASSEMBLY WITH THERMAL MANAGEMENT SYSTEM," which was filed on Feb. 12, 2010 by Robert Hitchcock et al., the contents of which are expressly incorporated by reference herein.

BACKGROUND

A light-emitting diode (LED) is a semiconductor diode that emits light when electrically biased. LEDs produce more light per watt than incandescent bulbs, and are often used in battery powered or energy-saving devices. With the advent of High Brightness LEDs, they are becoming increasingly popular in higher power applications such as flashlights, area lighting, and regular household light sources. LED performance largely depends on the efficacy (Lumens of light emitted per watt of input power), and the current level used to drive the devices. Reliability of the LEDs depends on maintaining the semiconductor junction temperature below the temperature limit specified by the manufacturer. Driving the LED hard in high ambient temperatures may result in overheating of the LED package, resulting in poor performance and eventually leading to device failure. Consequently, adequate heat-sinking or cooling is required to maintain a long lifetime for the LED, which is especially important in applications where the LED must operate over a wide range of temperatures.

Generally, LED cooling systems rely largely on convective mechanisms to remove heat. Heat convection refers to heat transport by an external source, such as a fan. The use of passive thermally conductive materials that absorb the heat and slowly rise in temperature would be highly impractical for longer term thermal dissipation. For a non-limiting example, the size of a piece of aluminum needed to cool LEDs used in a typical lighting application for a time span of eight hours or more would be so large that the aluminum would never come to saturation and the LEDs would unacceptably spike up in temperature.

Therefore improved LED systems with improved heat-removal techniques are needed. The foregoing examples of the related art are intended to be illustrative and not exclusive. Other limitations of the related art will become apparent upon a reading of the specification and a study of the drawings.

SUMMARY

A lighting system is described. The lighting system includes a lamp and a first container including a first phase change material thermally connected to the lamp. Heat generated by the lamp during operation is conducted to the first phase change material. The system also includes a second container including a second phase change material thermally connected to the lamp. Heat generated by the lamp during operation is also conducted to the second phase change material, and the second phase change material has a transition point temperature lower than the transition point temperature of the first phase change material of the first container to account for a temperature drop between the second container and the first container. The lighting system also includes a temperature sensor for reducing lamp power if the lamp becomes too hot, and a mounting bracket which conducts heat away from the lamp into the fixture surrounding the lamp and subsequently convects the heat from the outside casing of the fixture into the ambient air.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Described in detail below are several examples of techniques for thermal management, mounting, and sensing of lighting systems. The following description provides specific details for a thorough understanding and enabling description of these examples. One skilled in the art will understand, however, that the techniques may be practiced without many of these details. Additionally, some well-known structures or functions may not be shown or described in detail, so as to avoid unnecessarily obscuring the relevant description.

Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this section.

Figure 1:
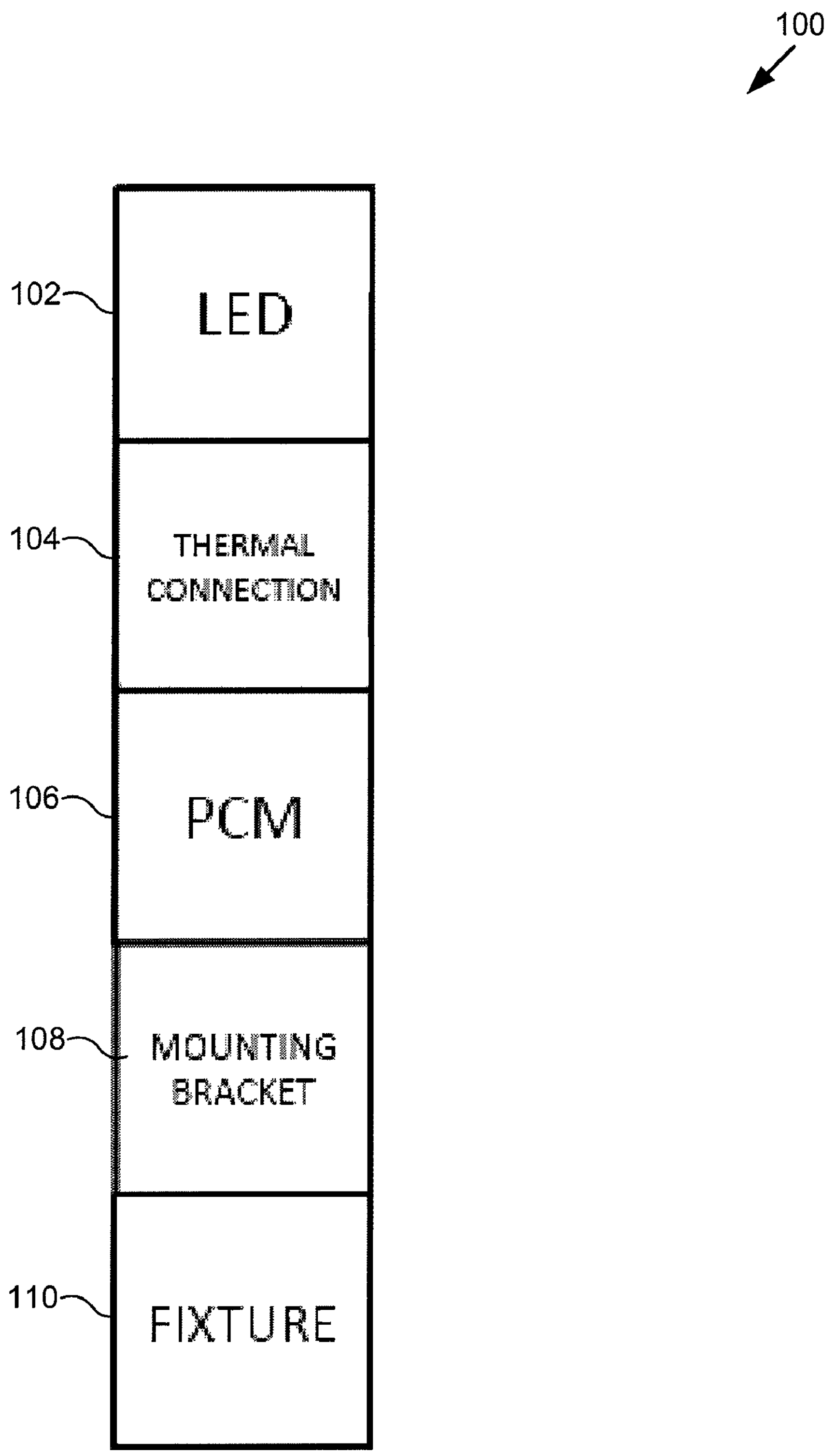
FIG. 1 depicts a block diagram of a lighting system including a phase change material (PCM) according to the present technique.

FIG. 1 depicts a block diagram of lighting system 100. Lighting system 100 includes LED 102, thermal connector 104, PCM unit 106, mounting bracket 108, and fixture 110. LED ("light emitting diode") 102 can have one or more lamps, which may be light emitting diodes, configured for illumination. LED 102 produces heat during operation that is conducted away through the other portions of lighting system 100 as discussed below.

PCM ("phase change material") unit 106 includes, in one embodiment, a high heat latency phase change material enclosed in a thermally conductive container. Phase change materials typically have a high latent heat of fusion such that a large amount of heat energy must be applied to change the PCM from, for example, a solid to a liquid, or from a solid having a first characteristic to a solid having a second characteristic. Illustrative PCMs are sodium sulphate, magnesium chloride, and barium hydroxide compositions. At temperatures below and above a PCM's transition point temperature, the PCM temperature rises as the PCM absorbs heat. However, at the PCM's transition point temperature, the PCM absorbs heat without increasing in temperature until a change of state occurs. As such, a PCM can "clamp" the temperature of its surroundings at its transition point temperature.

PCM unit 106 is effectively clamped at the transition point temperature until a complete PCM change of phase has occurred. LED 102 and PCM unit 106 are coupled via thermal connector 104 so that the heat generated by LED 102 can be transferred to PCM unit 106. Because there is a known temperature drop along thermal connector 104, the clamping temperature of PCM unit 106 effectively clamps the temperature of LED 102 at a slightly higher temperature. During the clamping period, PCM unit 106 absorbs all or at least a portion of the heat or energy released into lighting system 100 while keeping a steady temperature so that lighting system 100 may continue to work within a normal working temperature range.

This clamping effect is especially important for LED-based lighting systems because the available output capacity, efficiency, and life of an LED are highly dependent upon the LED junction temperature, and the LED junction temperature can rise if the temperature of lighting system 100 rises. The clamping effect can provide benefits in several different ways. For example, in one embodiment the clamping effect can be used to drive a configuration of LEDs with a higher current, under ordinary ambient conditions, to provide more light output than would otherwise be possible or sustainable at that current. In another embodiment, the clamping effect can be used to drive a configuration of LEDs with an ordinary current, under extreme ambient conditions (e.g., in a hot desert environment), to provide more light output than would otherwise be possible or sustainable in those conditions.

In one embodiment, not all heat generated by LED 102 is transferred into PCM unit 106 during operation. Instead, some heat bypasses PCM unit 106 into fixture 110 via mounting bracket 108. Fixture 110 can be, for example, a portion of a structure to which the remainder of lighting system 100 is mounted via mounting bracket 108. In such an embodiment, mounting bracket 108 functions as a thermal connection between PCM unit 106 and fixture 110 in a manner similar to thermal connector 104. In one embodiment, the thermal characteristics of thermal connector 104, PCM unit 106, and mounting bracket 108 are selected to optimize the flow of heat from LED 102 into PCM unit 106 and into fixture 110. Fixture 110 in some embodiments functions as a heat sink, subsequently transferring the heat into the ambient air surrounding the fixture.

Figure 2:
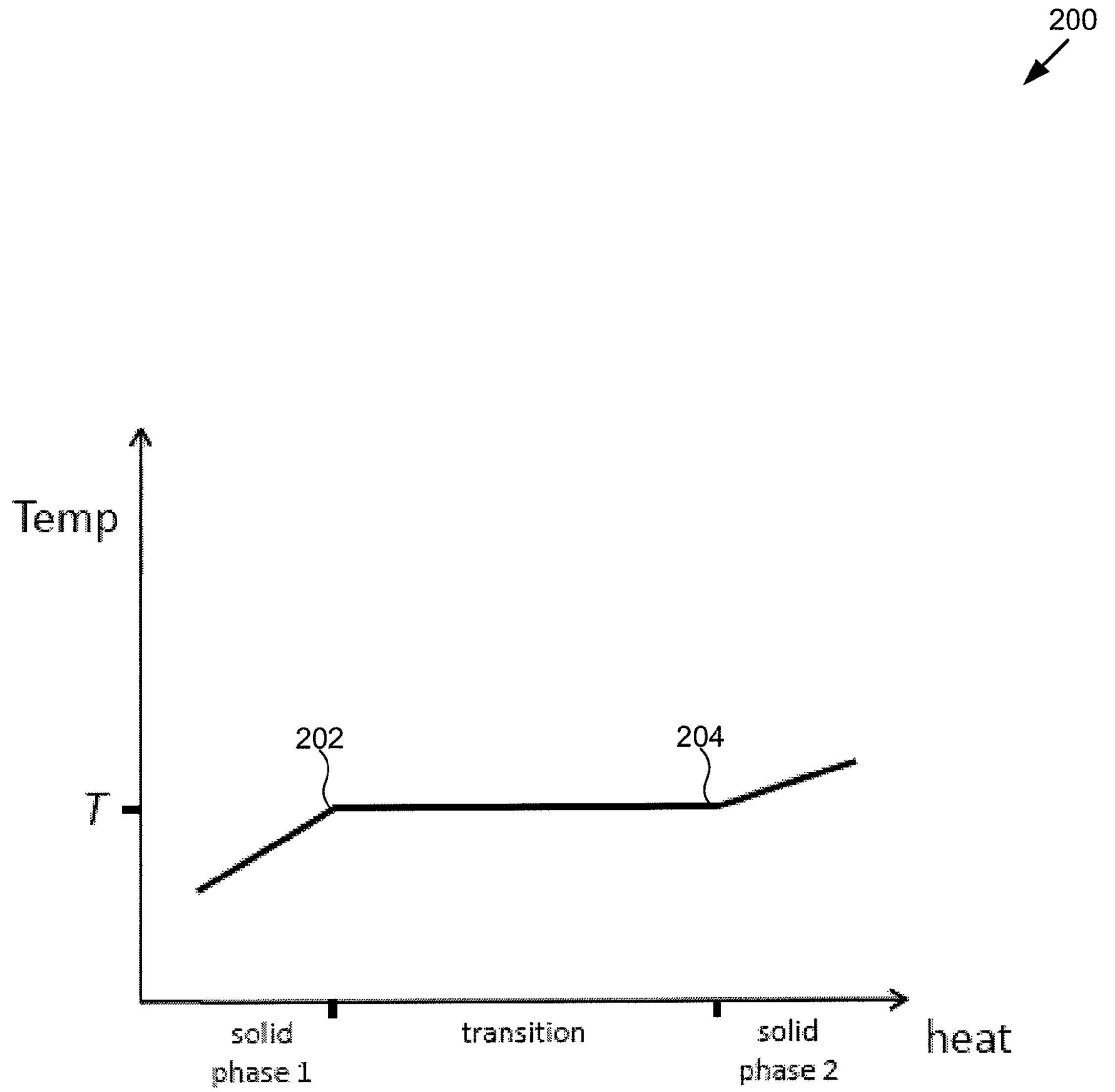
FIG. 2 depicts a graph of temperature change in a phase change material.

FIG. 2 illustrates graph 200, which depicts a pattern of temperature change of a PCM, such as the phase change material within PCM unit 106 in FIG. 1, as heat is added over time. Prior to point 202, the PCM is in a first solid phase. At point 202, the PCM temperature reaches a transition point temperature and enters a phase transition state. The temperature of the PCM is clamped at the transition point temperature and continues to absorb heat until the PCM has reached the second solid phase at point 204. As heat continues to be added to the PCM, to the right of point 204, the temperature of the PCM again starts to increase, because the PCM has become saturated. Notably, various types of PCMs can have varying first and second phases to the left and right of points 202 and 204, respectively. As such, the types of PCM utilized by the present techniques are not limited to PCMs having solid and liquid phases, or first solid and second solid phases, for example.

Figure 3A:
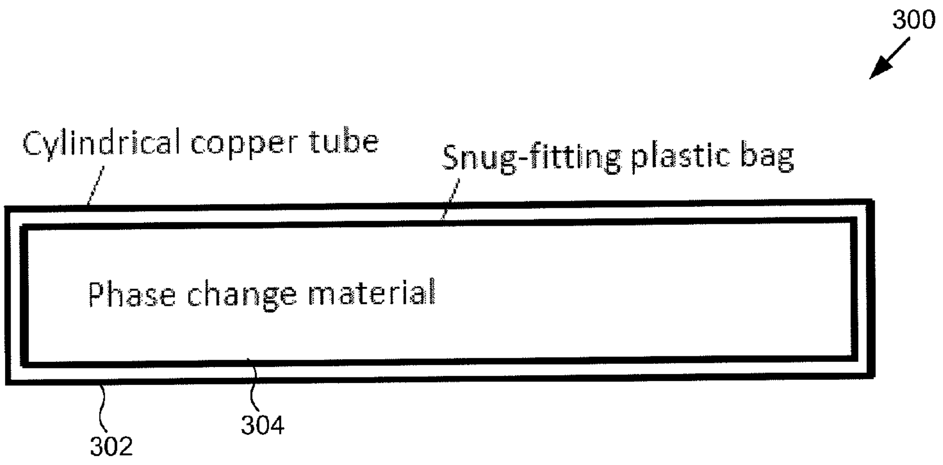
FIGS. 3*a* and 3*b* depict PCM units.

FIG. 3*a* illustrates PCM unit 300 including container 302, which in one embodiment is a cylindrical copper tube. Illustratively, container 302 can have other shapes, such as spheroid, cubic, etc. As illustrated in subsequent Figures, various embodiments are depicted with cylindrical PCM containers, but it should be understood that those various embodiments also can have other shapes besides a cylindrical shape.

Container 302 is in one embodiment a sealed container used to contain the PCM as the PCM alternates between solid and liquid phases, although there are embodiments in which an unsealed container may also be used. In addition, in one embodiment the PCM has a water content, and sealed container 302 prevents the water in the PCM from dehydrating to the surrounding environment. In one embodiment, sealed container 302 is "gas tight," so that it tends to be substantially impermeable to gases. In one embodiment, sealed container 302 is metallic or metallized. In one embodiment sealed container 302 may be plastic and coated with a metal film for blocking moisture transfer over many years of use. In one embodiment, if the PCM is sealed in interior container 304, such as a snug-fitting plastic bag within container 302, then container 302 does not have to be sealed. Notably, in one embodiment container 302, interior container 304, or both, may function as a pressure vessel. This feature is important in embodiments in which the PCM experiences volume or density changes during heating or cooling that cause pressure changes within containers 302 and 304. Without functioning as a pressure vessel, in some situations containers 302 and 304 can leak or otherwise fail.

Figure 3B:
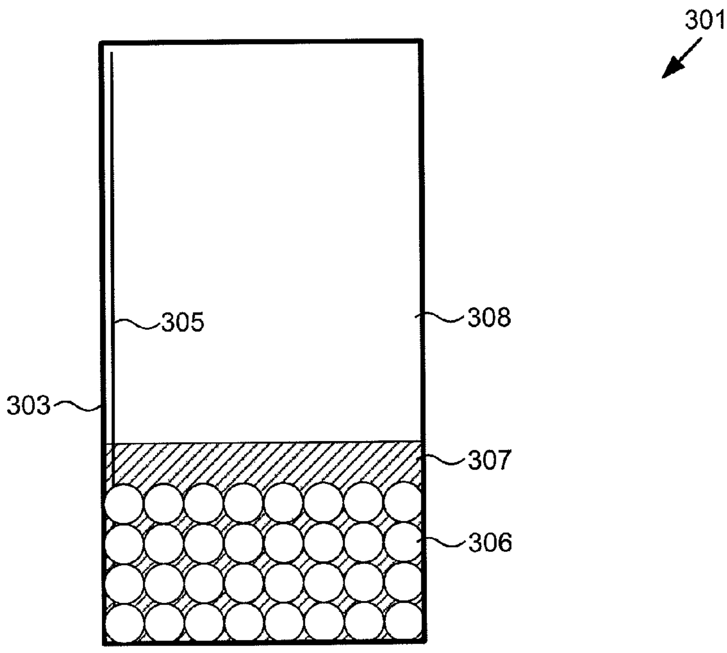

FIG. 3*b* illustrates PCM unit 301 including container 303, which in one embodiment is a cylindrical copper tube similar to container 302 shown in FIG. 3*a*. Container 303 encloses PCM pellets 306 and can be configured as a heat pipe. Canister 303 is filled at least partially with encapsulated PCM pellets 306 and partially with working liquid 307. Working liquid 307 can be selected for the desired operating temperature of a lighting system that includes PCM unit 301. Water can be suitable for use as working liquid 307 for operating temperatures in the temperature range from 30° to 100° in one embodiment.

In one embodiment, after PCM pellets 306 are added to canister 303 and the air is evacuated, working liquid 307 can be added. The partial vacuum below the vapor pressure of water inside canister 303 ensures that there will be both liquid and gaseous water present. Liquid 307 sits at the base of canister 303 (depending on orientation and gravitational gradient), and when sufficient heat is applied to canister 303 from a lighting system which is thermally coupled to canister 303, working liquid 307 vaporizes and gas 308 flows to a cooler region within canister 303, where it condenses. The condensed liquid then falls back into working liquid 307, or an optional wick 305 can be used that moves liquid back to working liquid 307 through capillary action. As illustrated in subsequent Figures, various embodiments are depicted with PCM units, and it should be understood that those various embodiments can utilize PCM unit 300 or PCM unit 301 as appropriate.

Figure 4A:
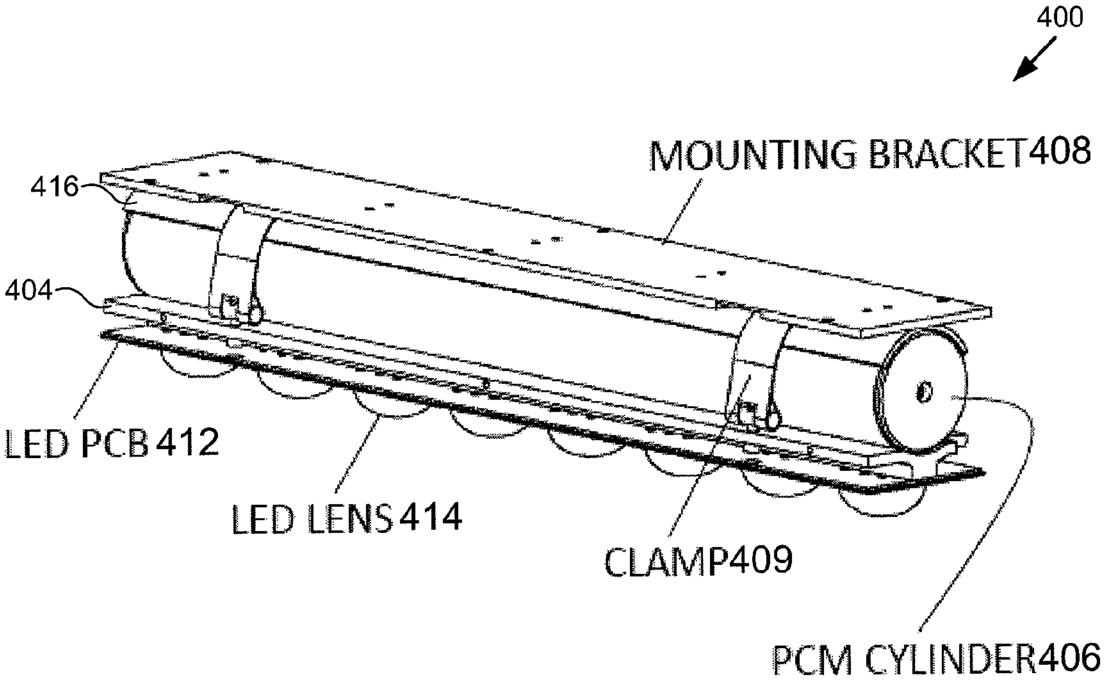
FIGS. 4*a* and 4*b* depict a diagram of a lighting system including a PCM cylinder, clamps, a mounting bracket, and a diffuser.
Figure 4B:
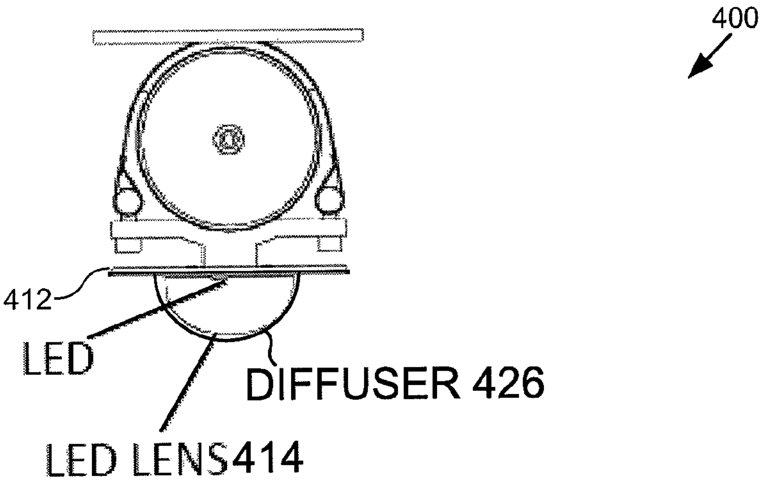

FIGS. 4*a* and 4*b* depict diagrams of lighting system 400. As shown in FIG. 4*a*, lighting system 400 includes thermal connector 404, PCM cylinder 406, mounting bracket 408, clamp 409, PCB ("printed circuit board") 412, and LED lens 414. Lighting system 400 produces heat during operation that is conducted away or absorbed as discussed below.

LEDs can be mounted on PCB 412. The LEDs correspond, in one embodiment, to LED 102 in FIG. 1. PCB 412 is thermally connected via thermal connector 404 to PCM cylinder 406. In one embodiment, PCM cylinder 406 corresponds to PCM unit 106 in FIG. 1, and thermal connector 404 corresponds to thermal connector 104 in FIG. 1. Clamp 409 fixes PCB 412, thermal connector 404, and PCM cylinder 406 to mounting bracket 408. Contact part 416 is included in one embodiment to improve thermal conduction between PCM cylinder 406 and mounting bracket 408. The mass and shape of contact part 416 can be selected to regulate the difference between, for example, heat absorption into PCM cylinder 406 and heat absorption into mounting bracket 408. Thus, in embodiments in which PCM cylinder 406 has primary responsibility for thermal management, contact part 416 is selected with a mass and shape for low thermal conductivity, so that little heat bypasses PCM cylinder 416 into and beyond mounting bracket 408. Alternatively, when mounting bracket 408 and exterior components have primary responsibility for thermal management, contact part 416 is selected with a mass and shape for high thermal conductivity, so that most heat bypasses PCM cylinder 406.

FIG. 4*b* depicts an end view of lighting system 400. LED lens 414, which is one lens among several lenses of lighting system 400 depicted in FIG. 4*a*, is mounted over the LEDs to create illumination patterns. LED lens 414 may be a hemisphere, a half hemisphere, or another shape to create various illumination patterns. LED lens 414 can be designed to produce a uniform illumination pattern. In some embodiments, where uniform illumination is desired, an additional diffuser 426, a mixing surface, can be included within or on the surface of LED lens 414 to provide improved diffusion or mixing of the light from the LEDs. Such mixing surfaces are particularly useful in embodiments where there are multiple LEDs under each lens, because the effect of multiple LEDs shining through the lens from different locations under the lens can be the production of unwanted images in the far field. Inclusion of diffuser 426 can ameliorate the effect of unwanted images.

Figure 5A:
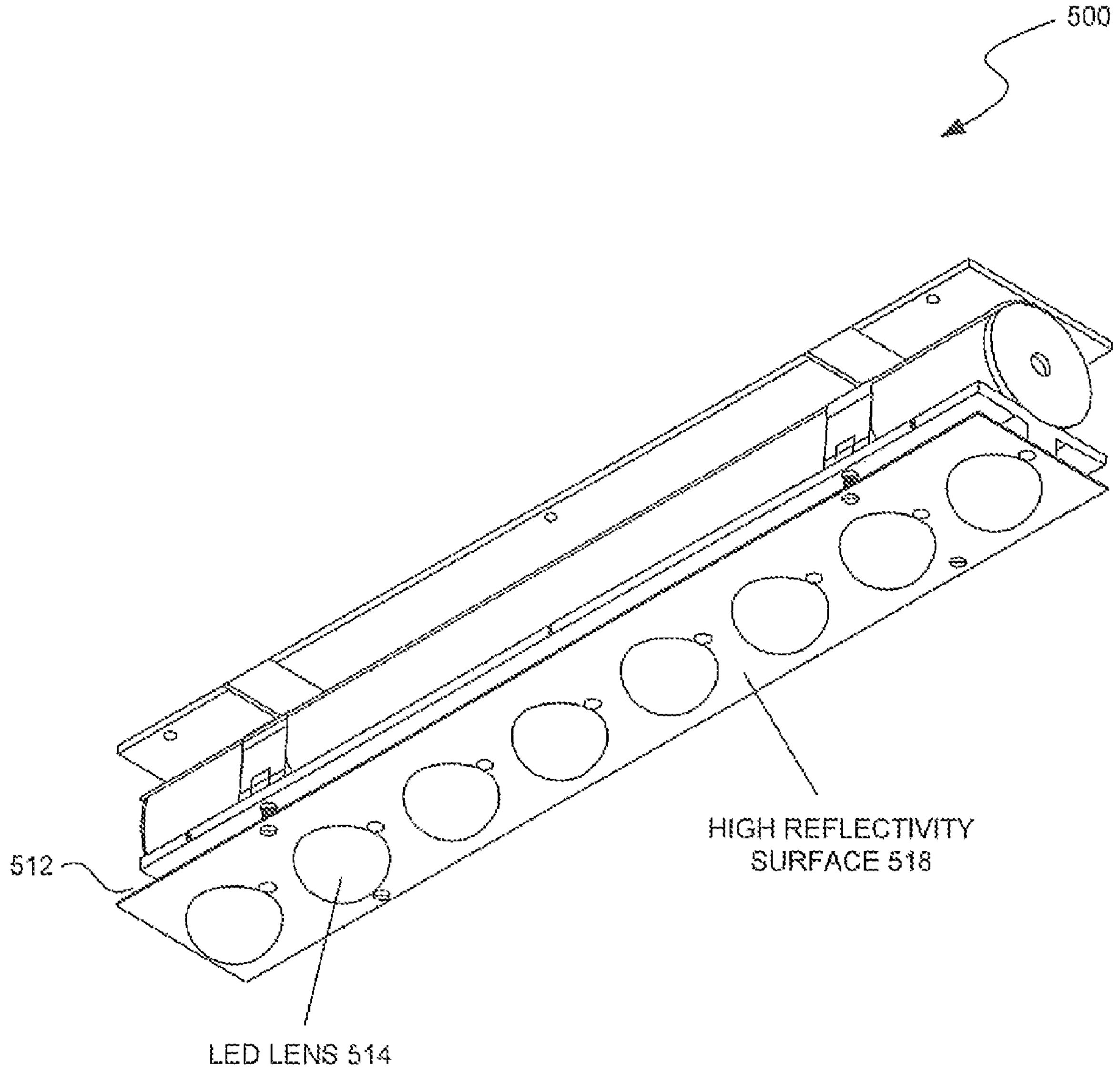
FIG. 5*a* depicts a diagram of a lighting system including a high reflectivity surface.

FIG. 5*a* depicts a diagram of lighting system 500. Lighting system 500 includes PCB ("printed circuit board") 512, LED lens 514, and high reflectivity surface 518. In one embodiment, high reflectivity surface 518 is a portion of PCB 512. In another embodiment, high reflectivity surface 518 is a separate surface that is substantially coplanar with PCB 512. High reflectivity surface 518 promotes maximum light output from lighting system 500, and can be made of, for example, polished aluminum or silver.

Figure 5B:
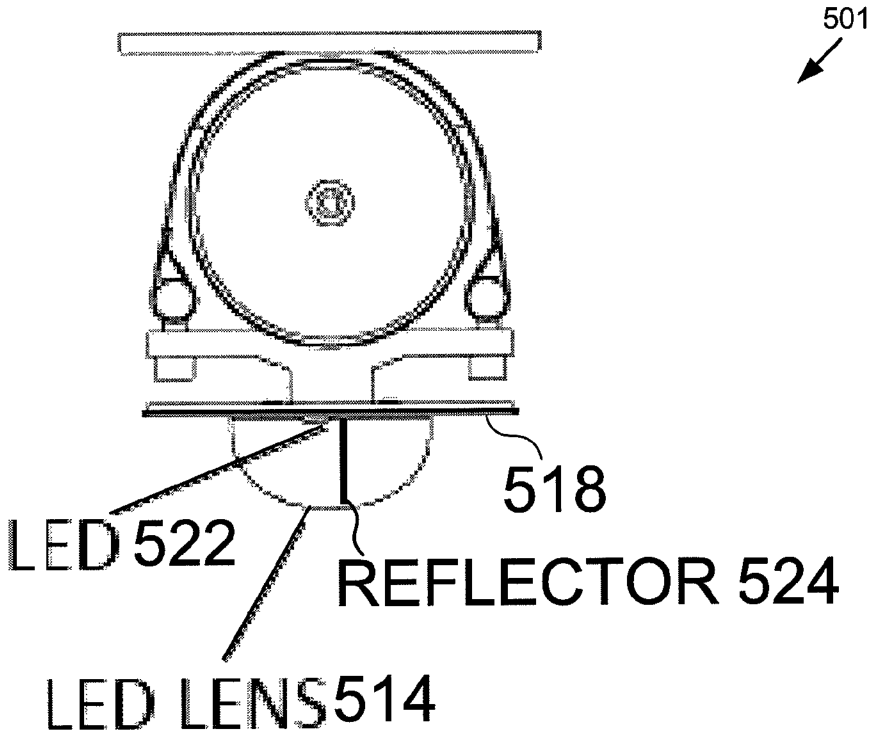
FIGS. 5*b* and 5*c* depict diagrams of a lighting system including a lens reflector.
Figure 5C:
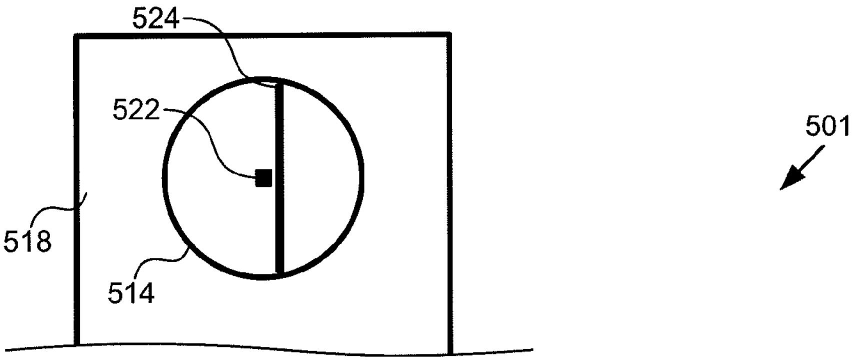

FIGS. 5*b* and 5*c* depict diagrams of lighting system 501. In particular, FIG. 5*b* depicts a side view of one end of lighting system 501, while FIG. 5*c* depicts a bottom view of part of lighting system 501. Lighting system 501 corresponds, in one embodiment, to lighting system 500 in FIG. 5*a*. Lighting system 501 includes LED lens 514, high reflectivity surface 518, LED 522, and reflector 524. High reflectivity surface 518 promotes maximum light output from lighting system 501. Reflector 524, disposed within lens 514 as shown in FIGS. 5*b* and 5*c*, reflects substantially half of the light emitted by LED 522 into a narrower angle than would otherwise be the case in an embodiment omitting reflector 524. Notably, in an embodiment of lighting system 501 including multiple LEDs and lenses including LED 522 and lens 514, each lens can include a separate, dedicated reflector, such as reflector 524. In another embodiment including multiple LEDs and lenses including LED 522 and lens 514, a longer reflector (not shown in FIGS. 5*b* and 5*c*) that occupies the length of reflective surface 518 and passes through each of the lenses can be included. Such a longer reflector would appear substantially similar to reflector 524 as depicted in FIG. 5*b*, but would extend pass the edges of lens 514 as depicted in FIG. 5*c*.

Figure 6A:
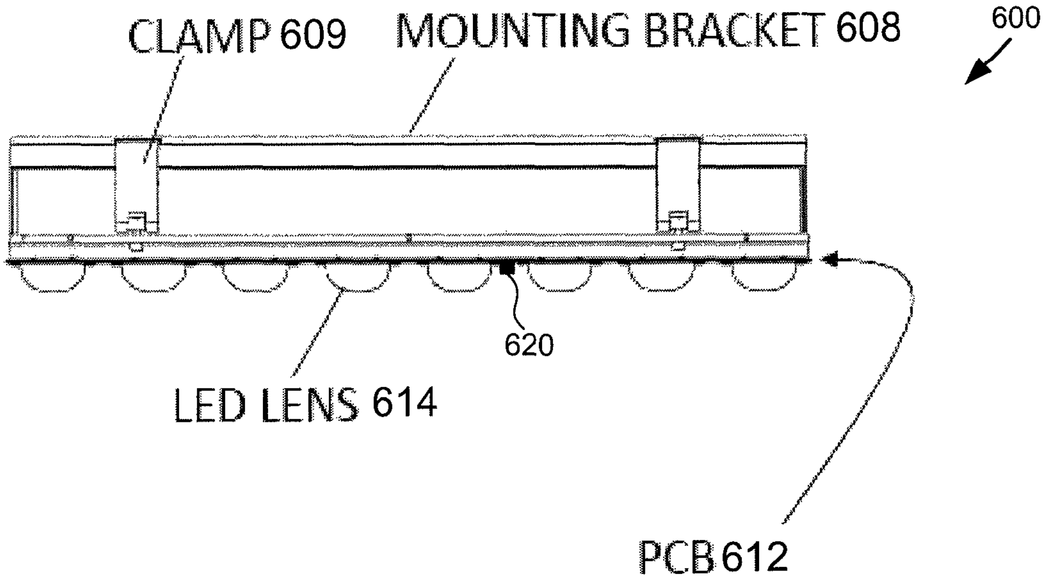
FIG. 6*a* depicts a diagram of a lighting system including a temperature sensor.

FIG. 6*a* depicts a side view diagram of lighting system 600. Lighting system 600 includes PCB 612, LED lens 614, clamp 609, and mounting bracket 608. Temperature sensor 620 mounted on PCB 612 near the LEDs under LED lenses, such as LED lens 614, detect over-temperature conditions and trigger current limiting circuits as needed to protect the LEDs. Although temperature sensor 620 is depicted in FIG. 6*a* as being separate from an LED lens, in one embodiment temperature sensor 620 is under an LED lens, closer to an LED. In another embodiment, temperature sensor 620 can be an external temperature monitoring sensor mounted to a suitable location in the thermal connection path and coupled to PCB 612. Temperature sensor 620 can be implemented as, for example, a thermistor coupled to supporting circuitry on PCB 612.

Figure 6B:
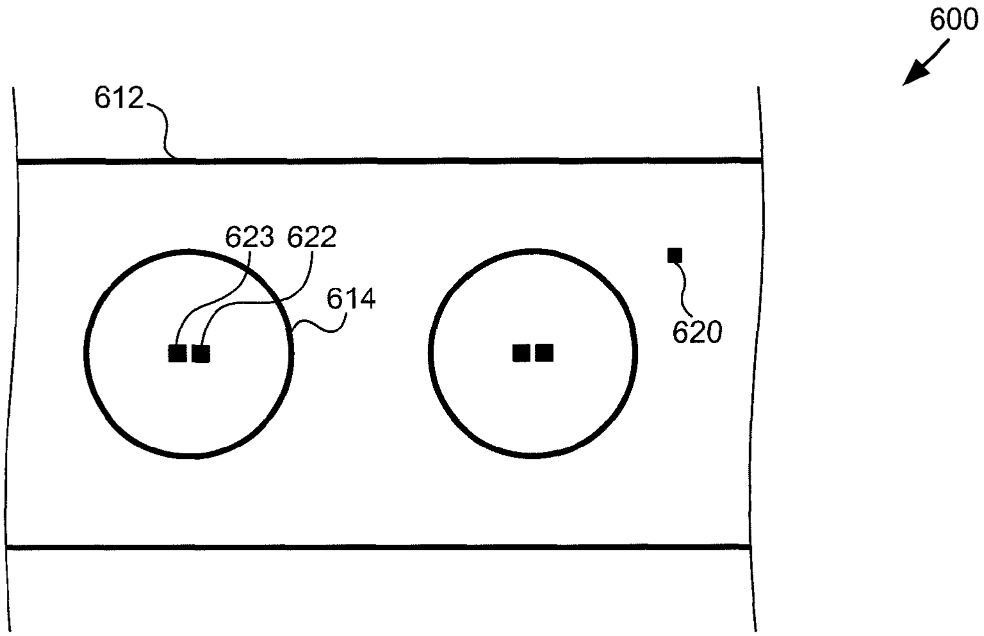
FIG. 6*b* depicts a diagram of a lighting system including a temperature sensor with a group of light emitting diodes (LEDs) under each lens.

FIG. 6*b* depicts a bottom view diagram of lighting system 600. As depicted in FIG. 6*b*, a group of LEDs can be under each lens. For example, LED 622 and LED 623 are shown under lens 614. In one embodiment, by including more than one LED under each lens, the amount of light produced by lighting system 600 can be reduced by turning off a portion of the LEDs under each lens without turning off all of the LEDs under any one lens. For example, to produce half-illumination, LED 622 (and corresponding LEDs under lenses other than lens 614) can be turned off, while LED 623 (and corresponding LEDs) can remain on. This method of producing half-illumination is more suitable in many respects than a method of turning off half of the LEDs in an embodiment with only one LED under each lens, because in that embodiment half of the lens would appear dark. A further advantage of including multiple LEDs under each lens involves luminous efficiency: generally, for a given level of illumination, utilizing more LEDs yields higher luminous efficiency because each LED is responsible for less of the total luminous output, and because an LED is generally more efficient at a lower power level. Thus, for a given number of lenses, including multiple LEDs under each lens yields higher luminous efficiency.

Figure 7:
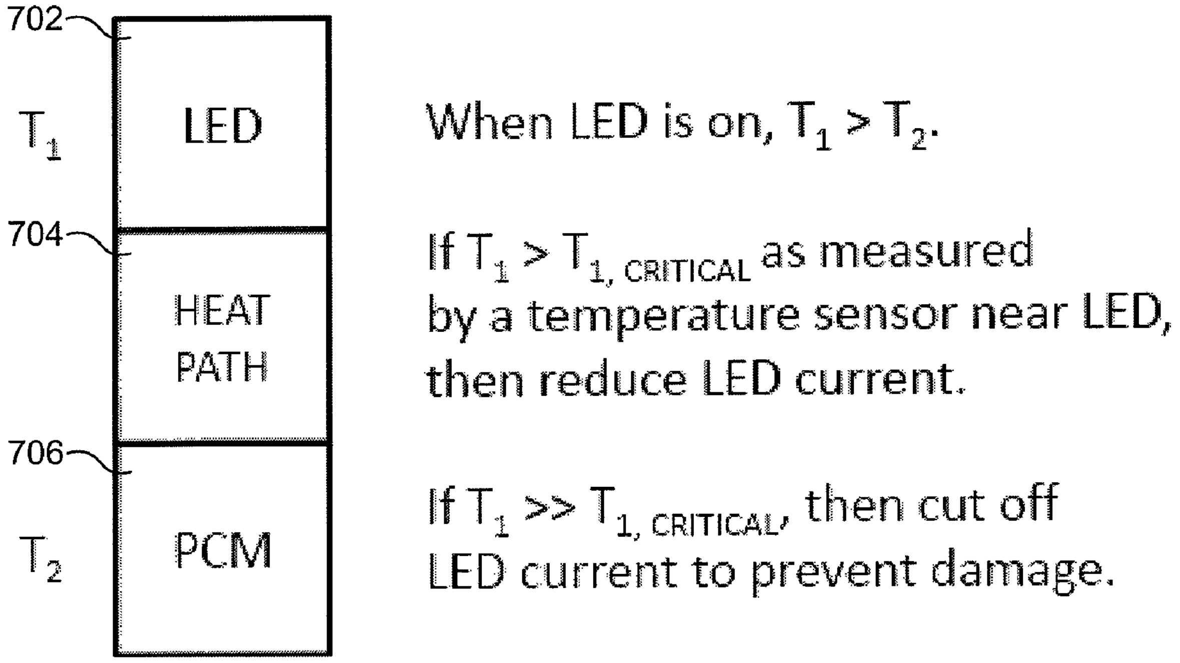
FIG. 7 depicts a block diagram of a lighting system and operational details of a temperature sensor.

FIG. 7 depicts LED 702, PCM 706, and operational details of a temperature sensor such as temperature sensor 620 in FIG. 6. The temperature of LED 702 is monitored by a temperature sensor, such as temperature sensor 620, mounted near LED 702. The transition point temperature of PCM 706 is designed to be lower than the desired LED 702 operating temperature, T1, to account for temperature drop along heat path 704 between LED 702 and PCM 706. If LED 702 temperature is too hot, i.e. T1>T1_CRITICAL, then the current driving LED 702 is automatically reduced by a circuit or by control software, as appropriate. The current can even be cut off completely if the temperature becomes so hot that damage to LED 702 could occur. The automatic reduction or cutting off can be configured to occur at a limit temperature.

Figure 8A:
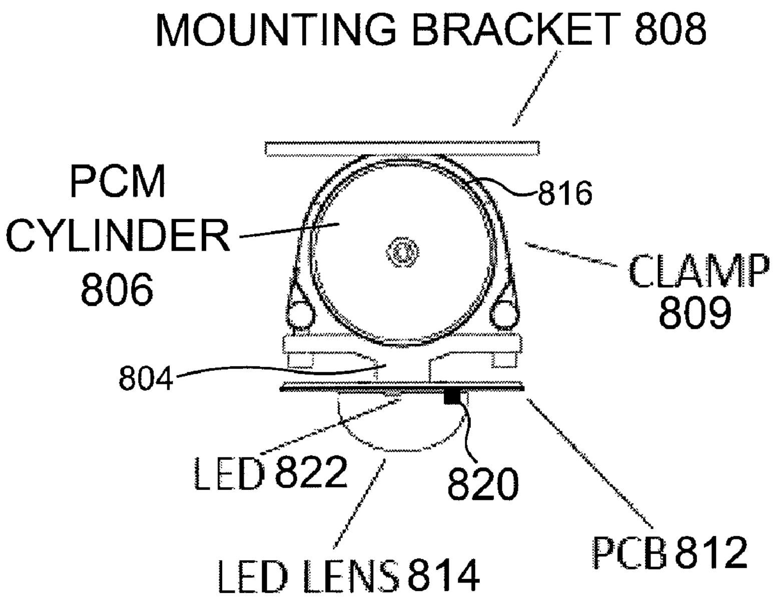
FIGS. 8*a* and 8*b* depict diagrams of a lighting system with a temperature sensor in two different angled configurations.
Figure 8B:
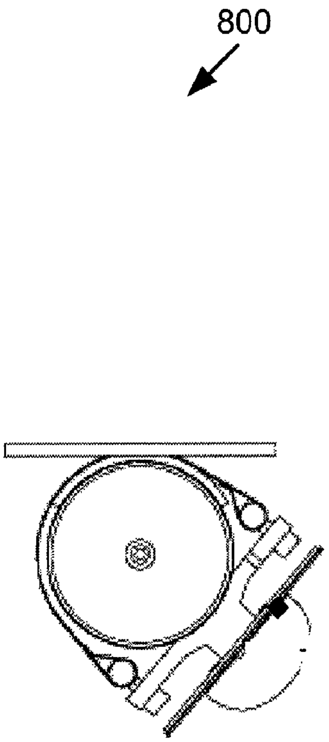

FIGS. 8*a* and 8*b* depict diagrams of lighting system 800 in two configurations. Lighting system 800 includes thermal connector 804, PCM cylinder 806, mounting bracket 808, clamp 809, PCB 812, LED lens 814, contact part 816, temperature sensor 820, and LED 822. Lighting system 800 produces heat during operation that is conducted away or absorbed as discussed below.

LED 814 is mounted on PCB 812. PCB 812 is thermally connected via thermal connector 804 to PCM cylinder 806. In one embodiment, PCM cylinder 806 corresponds to PCM unit 106 in FIG. 1, and thermal connector 804 corresponds to thermal connector 104 in FIG. 1. Clamp 809 attaches PCB 812, thermal connector 804, and PCM cylinder 806 to mounting bracket 808. Contact part 816 is included in one embodiment to improve thermal conduction between PCM cylinder 806 and mounting bracket 808. LED lens 814 is mounted over LED 822 to create illumination patterns and may also be mounted over temperature sensor 820. LED lens 814 may be hemispherical, half-hemispherical, square, rectangular, elliptical or another shape to create various illumination patterns. Mounting bracket 808 connects lighting system 800 to a fixture, such as a wall or ceiling mount or a portion of a lamp mount, for example. Clamp 809 may be loosened to swivel and aim portions of lighting system 800 including LED 822 in a desired direction, as depicted in FIG. 8*b*. In another embodiment, clamp 809 need not be loosened for swiveling, but may instead be configured with a fixed tightness and sliding friction. Notably, in one embodiment such swiveling does not affect the thermal conductivity between thermal connector 804 and PCM cylinder 806, or between PCM cylinder 806 and contact part 816.

Figure 9:
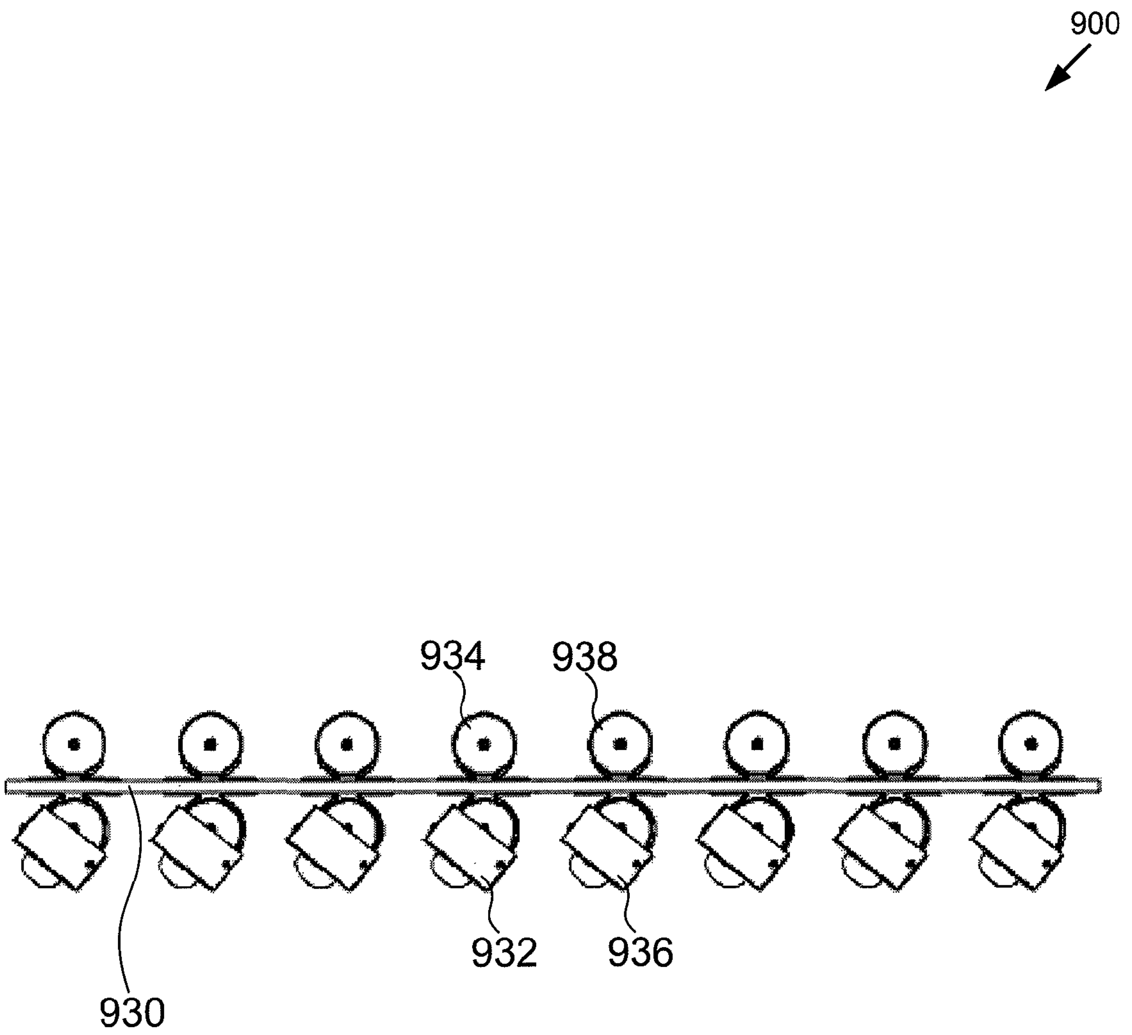
FIG. 9 depicts a diagram of a lighting array with multiple PCM cylinders.

FIG. 9 depicts lighting array 900, which includes fixture 930, a group of lighting systems including lighting system 932 and lighting system 936, and a group of independent PCM cylinders including independent PCM cylinder 934 and PCM cylinder 938. In one embodiment, the lighting systems of lighting array 900 each correspond to lighting system 800 in FIG. 8. The independent PCM cylinders of lighting system 900 are each "standalone" PCM cylinders that are not part of a particular lighting system. As such, each independent PCM cylinder can correspond, in one embodiment, to PCM unit 300 in FIG. 3*a*, for example. Although described as cylinders, independent PCM cylinders 934, 938, and so on can have different shapes in various embodiments.

In lighting array 900, fixture 930 thermally connects the lighting systems to the independent PCM cylinders. For example, fixture 930 thermally connects lighting system 932 to independent PCM cylinder 934. In one embodiment, fixture 930 also thermally connects lighting system 932 to independent PCM cylinder 938 and other independent PCM cylinders of lighting array 900. However, in another embodiment, fixture 930 can include thermal barriers (e.g., thermal insulating portions) for thermally isolating groups of independent PCM cylinders and lighting systems. For example, in such an embodiment, independent PCM cylinder 934 may receive heat only from lighting system 932, and independent PCM cylinder 938 may receive heat only from lighting system 936, etc.

Notably, in one embodiment, the independent PCM cylinders of lighting array 900 include phase change materials which are "tuned" separately from the phase change materials of the lighting systems. Such tuning includes selecting phase change materials for the independent PCM cylinders having lower transition point temperatures than the transition point temperatures of the phase change materials in the lighting systems. For example, independent PCM cylinder 934 can be tuned to have a transition point temperature lower than the transition point temperature of the phase change material in lighting system 932. One purpose of this tuning is to account for the temperature drop along the portion of fixture 930 between the independent PCM cylinder and lighting system under tuning consideration. The temperature drop occurs because, for example, some of the heat reaching fixture 930 is radiated away from or convected away from fixture 930 before reaching an independent PCM cylinder. After such tuning, the transition point temperatures of the phase change materials in the lighting systems can be set close to and slightly lower than the safe operating LED junction temperature of the LEDs in the lighting systems, and the transition point temperatures of the phase change materials in the independent PCM cylinders can be set yet lower to account for the temperature drop across fixture 930. The independent PCM cylinders provide additional thermal storage over and above that contained in primary thermal storage 932, and conceptually function similar to additional backup batteries, according to one analogy.

It should be noted that although lighting array 900 has only one "tier" of independent PCM cylinders, in other embodiments lighting array 900 can have additional tiers. In an embodiment having a second tier, the independent PCM cylinders in the second tier are tuned to have a transition point temperature lower still than the independent PCM cylinders in the first tier (e.g., independent PCM cylinders 934 and 938). Thus, overall, if lighting array 900 is configured with two tiers of independent PCM cylinders, then the phase change material in the lighting systems will be tuned to have a particular transition point temperature, and the phase change material in the first tier of independent PCM cylinders will have a lower transition point temperature, and the phase change material in the second tier of independent PCM cylinders will have the lowest transition point temperature.

Figure 10:
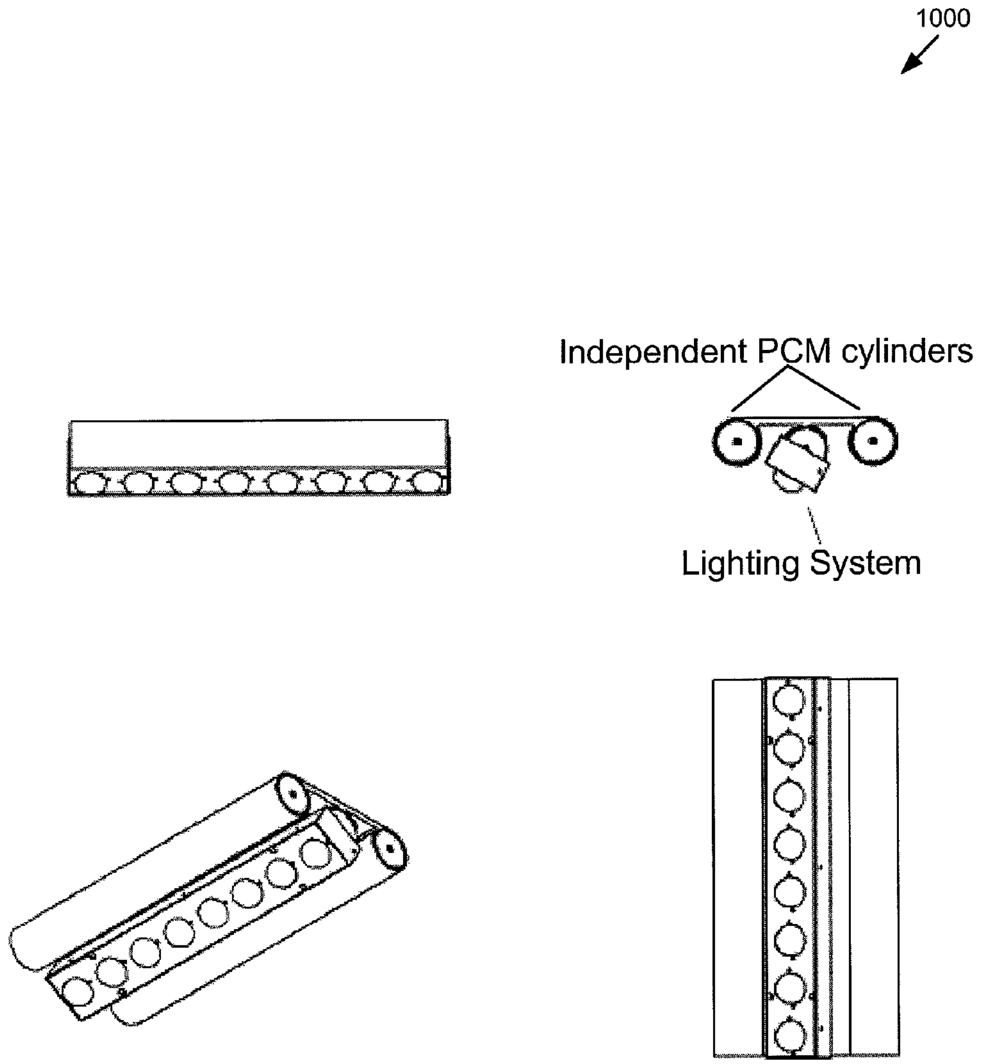
FIG. 10 depicts several views of a lighting array.

FIG. 10 depicts several views of lighting array 1000. In one embodiment, lighting array 1000 includes independent PCM cylinders that correspond to the independent PCM cylinders of lighting array 900. Further, lighting array 1000 includes a lighting system that corresponds, in one embodiment, to a lighting system in lighting array 900. Although lighting array 1000 is depicted as having only one lighting system, in another embodiment it may have a group of lighting systems. In lighting array 1000, independent PCM cylinders are arranged adjacent to the lighting system, on one side of a fixture corresponding, in one embodiment, to fixture 930 of lighting array 900. Because the lighting system and independent PCM cylinders are on one side of the fixture, lighting array 1000 maybe well suited for flush attachment of the fixture on a surface.

Notably, in one embodiment, the independent PCM cylinders of lighting array 1000 can include phase change materials which are "tuned" in the manner of lighting array 900. Further, it should be noted that although FIG. 10 depicts lighting array 900 as having only one pair of independent PCM cylinders, in other embodiments lighting array 900 can have additional pairs, at greater distances from the lighting system, in the manner of the tiers discussed with respect to lighting array 900. Thus, in an embodiment having an outer pair, the independent PCM cylinders in the outer pair are tuned to have a transition point temperature lower still than the independent PCM cylinders in the inner pair (i.e., the pair depicted in FIG. 10).

Figure 11A:
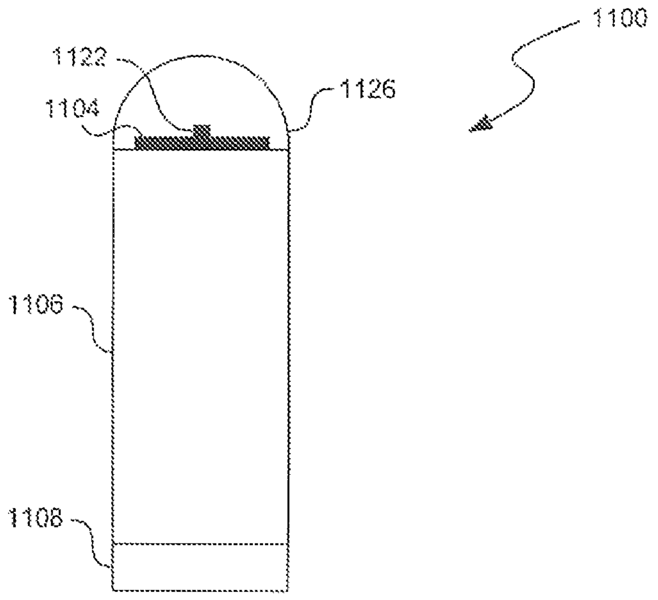
FIGS. 11*a* and 11*b* depict diagrams of a lighting system and a candle LED lamp, respectively, with LEDs disposed at one end of a PCM unit.
Figure 11B:
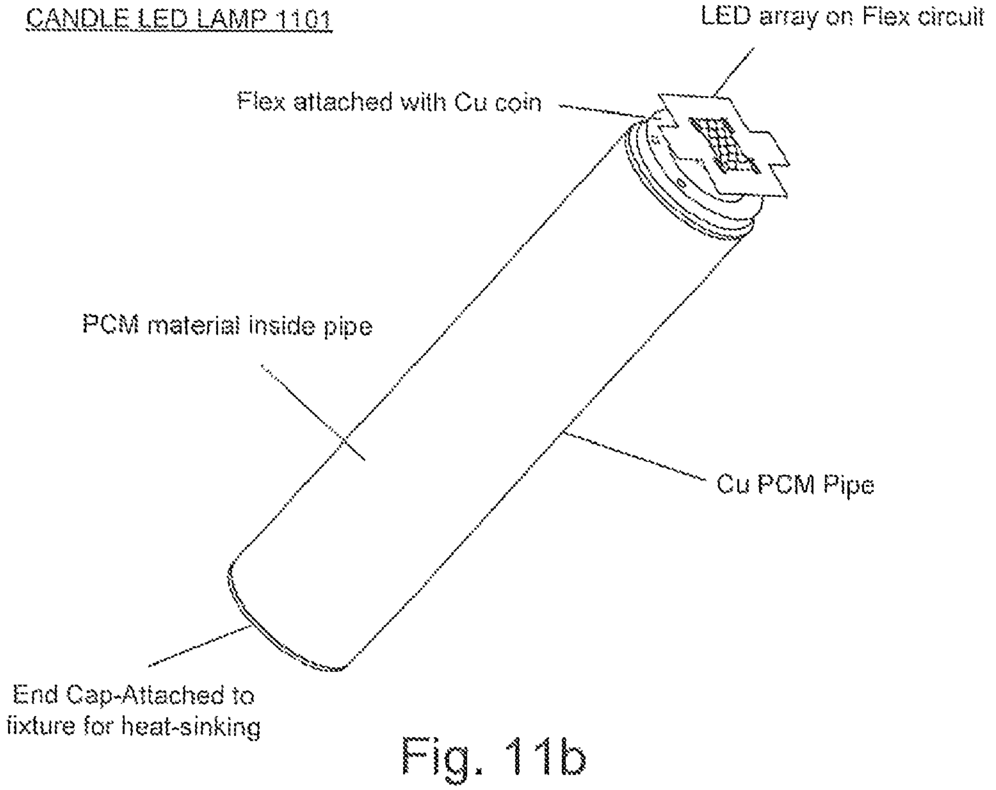

FIGS. 11*a* and 11*b* depict diagrams of lighting system 1100 and candle LED lamp 1101, respectively. In contrast with lighting systems discussed above (such as, for example, lighting system 400 depicted in FIGS. 4*a* and 4*b*), in lighting system 1100 and candle LED lamp 1101 heat generally flows along a length of a PCM cylinder, rather than across a diameter of a PCM cylinder. Said another, way, in lighting system 1100 and candle LED lamp 1101 the lamps (e.g., LED 1122) are disposed at one end of a PCM cylinder, rather than along a length of a PCM cylinder.

As shown in FIG. 11*a*, lighting system 1100 includes thermal connector 1104, PCM cylinder 1106, mounting bracket 1108, LED 1122, and diffuser 1126. LED 1122 can be mounted on a PCB (not shown) that is itself mounted on thermal connector 1104. Thermal connector 1104 can be, for example, a copper slug. LED 1122 corresponds, in one embodiment, to LED 102 in FIG. 1. In one embodiment, PCM cylinder 1106 corresponds to PCM unit 106 in FIG. 1, and thermal connector 1104 corresponds to thermal connector 104 in FIG. 1. In other embodiments, PCM cylinder 1106 can correspond to PCM unit 300 or 301 depicted in FIGS. 3*a* and 3*b*, respectively. In some embodiments, where uniform illumination is desired, diffuser 1126, a mixing surface, is included to provide improved diffusion or mixing of the light from LED 1122. Candle led lamp 1101, shown in FIG. 11*b*, is similar in lighting system 1100 in several regards. One difference shown in FIG. 11*b* is the inclusion of an LED array on a flexible circuit board, which may included or may be substituted for a PCB. FIG. 11*b* does not depict diffuser 1126 or an LED lens, but in another embodiment either may be included in candle LED lamp 1101.

Figure 12A:
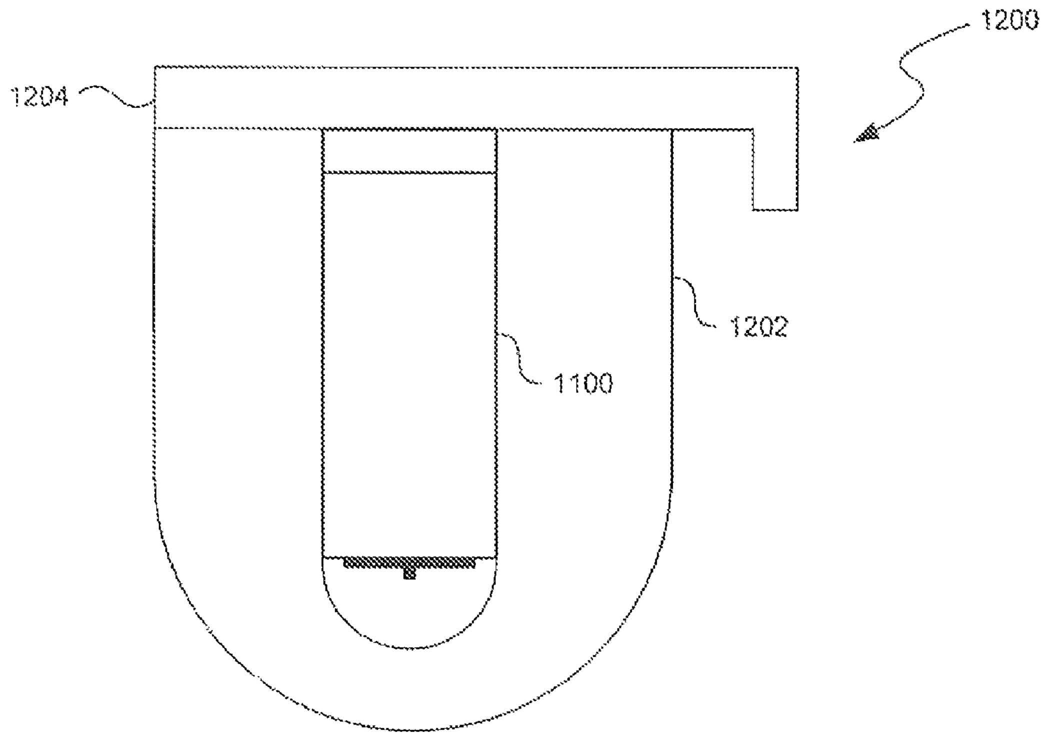
FIGS. 12*a* and 12*b* depict diagrams and pictures of a lighting system installed in a sealed lighting enclosure.
Figure 12B:
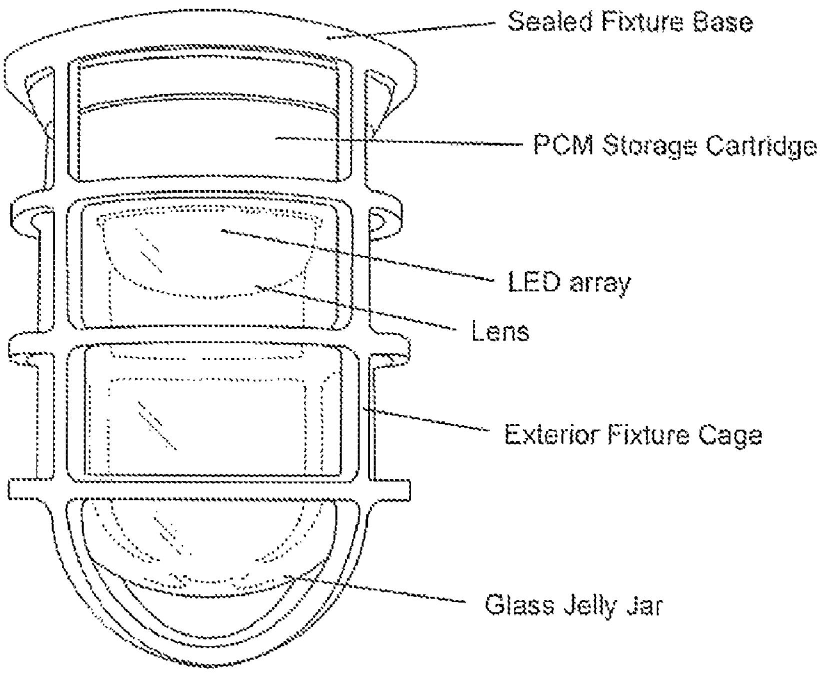

FIG. 12*a* depicts lighting system 1100 included in sealed lighting enclosure 1200. FIG. 21*b* depicts a picture of one illustrative embodiment of lighting system 1100. Sealed lighting enclosure 1200 includes base 1204 and cover 1202. Base 1204 includes a mounting fixture (e.g., a wall mount fixture) for attaching to a surface. Cover 1202 is, in one embodiment, a glass "jelly jar" cover configured to be screwed into base 1204, to seal sealed lighting enclosure 1200. By this sealing, sealed lighting enclosure 1200 is, in various embodiments, weatherproof, water resistant, or air-tight. Because of these characteristics, in various embodiments sealed lighting enclosure 1200 is also heat insulated, such that sealed lighting enclosure 1200 does not provide a high thermal conductivity path from lighting system 1100 to the exterior environment. As such, conventional LED lighting solutions, installed in sealed lighting system 1100, are prone to failure from overheating. However, by installing lighting system 1100 in sealed lighting enclosure 1200, failure is avoided because the PCM included in lighting system 1100 (i.e., in PCM cylinder 1106) serves to store thermal energy from operation and thereby prevent overheating despite the sealed nature of sealed lighting enclosure 1200.

The words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. The system can vary considerably in its implementation details while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A lighting system comprising:

a light emitting diode (LED);

a first container, containing a first phase change material, thermally coupled to the LED of the lighting system, wherein heat generated by the LED during operation is conducted to the first phase change material, and further wherein a first transition point temperature of the first phase change material is lower than a desired LED operating temperature to account for a temperature drop between the LED and the first phase change material; and a thermally conductive mounting bracket thermally coupled to the first container configured to conduct heat away from the LED, wherein an angle between the mounting bracket and the LED is adjustable to direct light from the LED in a new direction, and wherein a second container is thermally coupled to the LED, and wherein the second container contains a second phase change material having a second transition point temperature lower than the first transition point temperature of the first phase change material of the first container to account for a temperature drop between the second container and the first container.

2. The lighting system of claim 1, further comprising a temperature sensor configured to sense a temperature of the LED.

3. The lighting system of claim 2, wherein the lighting system is configured to reduce a power driving the LED if the temperature exceeds a limit temperature.

4. The lighting system of claim 1, further comprising a lens configured to create an illumination pattern utilizing light emitted by the LED.

5. The lighting system of claim 1, further comprising a diffuser for creating a more uniform illumination from the light emitted by the LED.

6. The lighting system of claim 1, wherein the first container is configured to contain pressure generated by the first phase change material during heat absorption.

7. The lighting system of claim 1, further comprising a reflective surface for reflecting light from the LED.

8. The lighting system of claim 1, wherein the first phase change material includes sodium sulphate, magnesium chloride, or barium hydroxide.

9. The lighting system of claim 1, further comprising a fixture coupled to the mounting bracket, wherein the fixture comprises a portion of a structure to which the lighting system is mounted through the mounting bracket, and further wherein the fixture convects heat from the LED into surrounding air.

10. A method comprising:

providing a plurality of light emitting diodes (LEDs), wherein the LEDs generate light and heat;

providing a first container configured to hold a first phase change material, wherein the first phase change material absorbs at least a first portion of the generated heat, and further wherein the first phase change material has a first transition point temperature lower than an optimum operating temperature of the LEDs;

providing a plurality of lenses, wherein each lens is configured to refract light from at least one LED;

providing a temperature sensor configured to measure an operating temperature of the LEDs;

when the temperature of the LEDs has exceeded a limit temperature, reducing an amount of power provided to the LEDs to reduce the temperature of the LEDs, wherein the temperature of the LEDs exceeds the limit temperature when the first phase change material has risen above the first transition point temperature;

providing a second container holding a second phase change material having a second transition point temperature, wherein the second transition point temperature is lower than the first transition point temperature;

thermally conducting at least a second portion of heat from the first container to the second container.

11. The method of claim 10, further comprising:

providing a board on which the LEDs are mounted;

providing a thermally conductive mounting bracket thermally coupled to the first container configured to conduct heat away from the LEDs, wherein an angle between the mounting bracket and the LEDs is adjustable to direct light from the LEDs in a different direction.

12. The method of claim 10, further comprising:

providing controls to turn on or off a first number of LEDs associated with each lens, wherein each lens refracts light from a second number of LEDs, and the first number is less than the second number, and further wherein each lens is configured to refract light from two or more LEDs.

13. A lighting system comprising:

a plurality of light emitting diodes (LEDs);

a plurality of lenses, each for refracting light from at least one of the plurality of LEDs; a board configured for mounting the plurality of LEDs and the plurality of lenses, wherein the board is thermally coupled to the plurality of LEDs;

a container, containing a phase change material, thermally coupled to the board, wherein heat generated by the plurality of LEDs during operation is conducted to the phase change material;

a mounting bracket thermally connected to the container, wherein the mounting bracket is configured for mounting the lighting system on a fixture; and one or more clamps configured for coupling together the board via a thermal connector, the container, and the mounting bracket a second container containing a second phase change material thermally coupled to the board and the second phase change material having a second transition point temperature, wherein the second transition point temperature is lower than the first transition point temperature.

14. The lighting system of claim 13, further comprising a reflective surface, wherein the board is further configured to mount the reflective surface, and the reflective surface is positioned to reflect light from the plurality of LEDs.

15. The lighting system of claim 13, wherein the container is cylindrical, and further wherein the board can be rotated on the one or more clamps around the cylindrical container to redirect light from the plurality of LEDs.

16. The lighting system of claim 13, wherein light emitted from each LED is refracted by a different lens.

17. The lighting system of claim 13, wherein light emitted from two or more LEDs are refracted by each one of the plurality of lenses.

18. The lighting system of claim 13, further comprising a temperature sensor configured to sense a temperature of the plurality of LEDs, and wherein the lighting system is configured to reduce a power driving the plurality of LEDs if the temperature exceeds a limit temperature.

* * * * *